United States Patent [19]
Garcia et al.

[11] 4,132,890
[45] Jan. 2, 1979

[54] SELF ADJUSTING TACHOMETER

[75] Inventors: Joe L. Garcia, Arvada; Paul Y. Hu, Boulder; Tracy N. Waller, Broomfield, all of Colo.

[73] Assignee: International Business Machines Corporation, Armonk, N.Y.

[21] Appl. No.: 853,921

[22] Filed: Nov. 22, 1977

[51] Int. Cl.² ............................................. G01D 5/36
[52] U.S. Cl. ............................... 250/231 SE; 250/233
[58] Field of Search ................ 250/231 SE, 231, 233; 324/175

[56] References Cited

U.S. PATENT DOCUMENTS

| | | | |
|---|---|---|---|
| 2,946,893 | 7/1960 | Baum | 250/233 |
| 3,693,024 | 9/1972 | Hulle et al. | 250/231 SE |
| 3,770,971 | 11/1973 | Somerset | 250/233 |
| 3,942,112 | 3/1976 | Westbrook | 324/175 |
| 3,995,156 | 11/1976 | Angersbach et al. | 250/231 SE |
| 3,997,782 | 12/1976 | Willits | 250/231 SE |

Primary Examiner—John Kominski
Attorney, Agent, or Firm—Joscelyn G. Cockburn

[57] ABSTRACT

The disclosure describes an electro-optical tachometer assembly for use with a device having a movable part and a fixed part (for example, a motor, an electrophotographic system, etc). The electro-optical tachometer assembly comprises a movable assembly and a fixed assembly. The movable assembly includes a movable disk while the fixed assembly includes a fixed mask. A gap between the movable disk and the fixed mask is preset by a spacer assembly. The gap is maintained constant by a resilient member which loads the fixed assembly against the movable assembly.

A light emitting diode (LED) phototransistor assembly is situated relative to the tachometer assembly and outputs electrical signals indicative of shaft speed, direction of shaft rotation, etc. Synchronization of the tachometer output to the shaft is accomplished by a guide pin arrangement.

15 Claims, 5 Drawing Figures

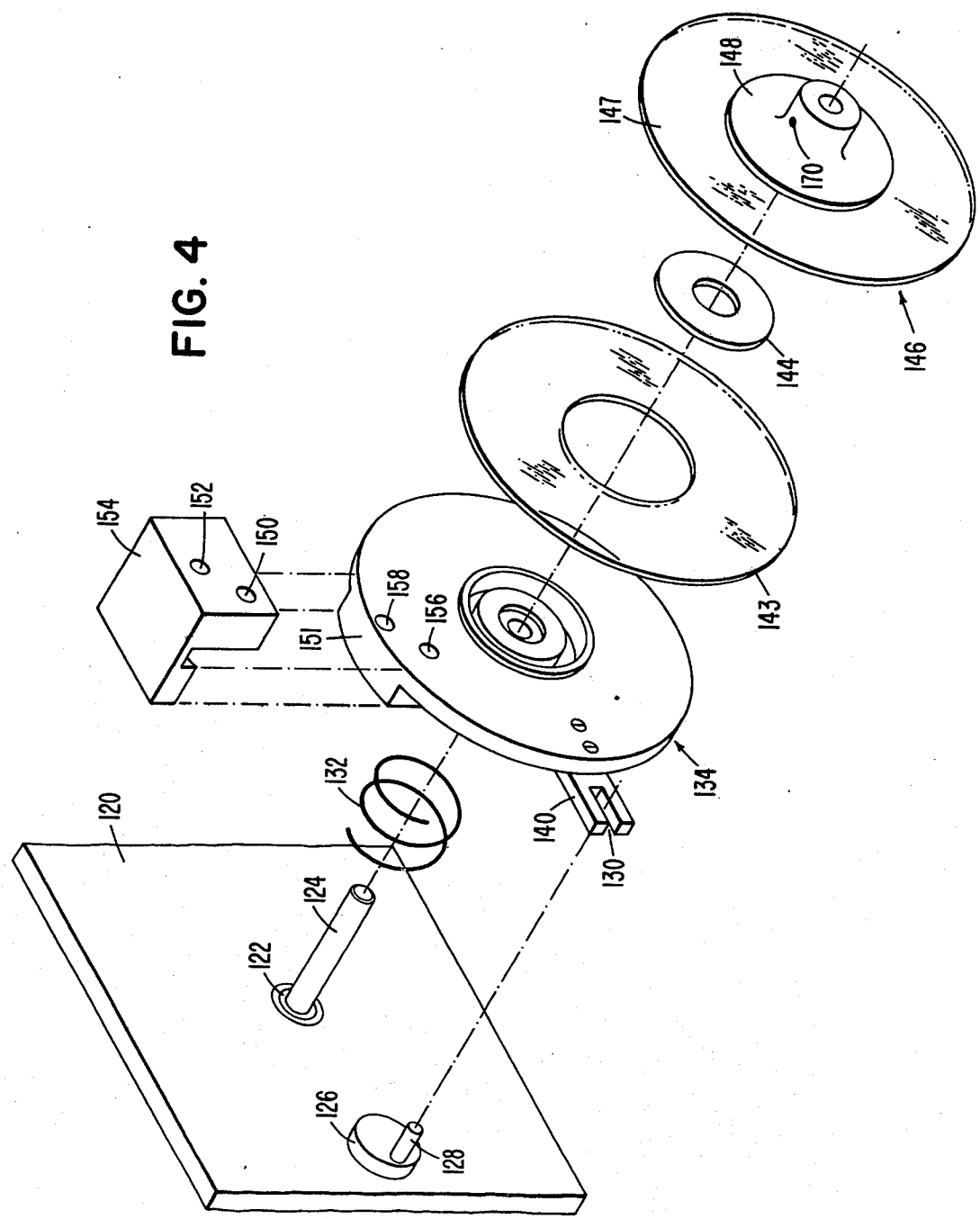

SELF ADJUSTING TACHOMETER

BACKGROUND OF THE INVENTION

1. Field of The Invention

The present invention relates to electro-optical transducers and more particularly to an electro-optical tachometer which is adapted to monitor a movable member and outputs electrical signals indicating the speed at which the member is moving, the direction of motion, and other functions relative to the moving member.

2. Description of The Prior Art

The use of an electro-optical tachometer for controlling the velocity of a movable member (e.g. rotating shaft, etc.) via a servo controlled loop, for detecting and measuring direction of motion and for performing other related functions (for example, monitoring movement and output a signal for each increment of motion) are well known in the prior art.

Prior art electro-optical tachometer consists of a fixed assembly, a movable assembly and a light emitting/light receiving assembly. In assemblying the electro-optical tachometer to perform any or all of the previously described functions, the movable assembly is fastened securely to the member whose motion, speed, etc. is to be monitored. For example, if the member is the rotating shaft of a motor then the movable assembly is attached to the rotating shaft. If the member is the head arm of a linear actuator then the movable assembly is fastened to the head arm. Generally, the movable assembly consists of a hub portion suitable for mounting on the movable member. An optical disk, having a plurality of alternating dark and light lines, (sometimes called an optical track), is concentrically mounted to the hub portion. As the shaft rotates, for example, the rotary motion is imparted to the hub and disk. Stated another way, the hub and disk rotate with the shaft.

The fixed assembly consists of a mask having an optical track thereon. The optical track on the mask is similar to the optical track on the rotating disk. The mask is positioned in spaced relationship to the rotating disk. The mask is generally mounted to a fixed portion of the device whose motion is measured. For example, to the housing of a motor or to the frame of a linear actuator. The spacing or gap between the fixed mask and the rotating disk is set by an operator using a shim. The thickness of the shim is equivalent to the spacing which is desired between the fixed mask and the rotating disk.

The light emitting/light receiving assembly is fixed, i.e., immovable and consists of a light emitting source, e.g., light emitting diodes (LED) and a light receiving source, e.g., light receiving transistor (LRT). The LED and the LRT are so arranged that the rotating disk passes therebetween. Thus, as the shaft is rotated the light emitted from the light source is received by the light receiving source each time a light line is positioned within the gap. The change in conductivity of the light receiving source caused by the received light is sensed and by means of appropriate circuitry (e.g., squaring circuitry) a voltage signal is generated. A more detailed description of the prior art electro-optical tachometer is described in U.S. Pat. Nos. 3,693,023 and 3,770,971.

Although the prior art electro-optical tachometer functions satisfactorily for its intended purpose, it is plagued with several problems. The invention disclosed hereinafter is intended to eliminate the prior art problems.

As was mentioned previously in the prior art, the space or gap between the rotating disk and stationary mask is set by an operator using a shim. As is used herein the term shim means a flat thin piece of material having a thickness equivalent to the desired spacing. In actuality, as the tachometer is assembled the operator inserts the shim between the mask and disk. The operator then pulls the shim out and the process is continued until the operator experiences resistance from the mask and disk. At this point it is assumed that the gap is at least equivalent to the thickness of the shim. The operator then tightens the assembly and the gap setting is completed.

Due to the human factor variance there is no repeatability in gap setting. Stated another way, the gap setting is not constant between two electro-optical tachometers even if the spacing is set by the same operator. As is well known to those skilled in the art, the output signals from an electro-optical tachometer are a function of the disk/mask spacing. If the spacing is not constant or if the spacing is too wide, then the ability of the circuits for processing the output from the light receiving source are impaired and the reliability of the electro-optical tachometer to measure a specific function is significantly reduced. In other words, the electro-optical tachometer is unreliable as a measuring instrument.

Still another problem associated with the prior art electro-optical tachometer is that a constant spacing cannot be maintained between the mask and the optical disk. If the spacing changes from an initial setting, for example increases, then the result is the previously described situation. This condition, although expensive and time consuming, may be corrected by resetting the gap.

A more disastrous condition occurs when the spacing narrows to the point where the disk and mask coincide or crash. Disk/mask crash is a result of the disk hub assembly walking on its movable member. For example, in the case of a rotating shaft the disk hub assembly moves on the shaft. Whenever this condition (i.e., disk/mask crash) occurs, the optical pattern (i.e., the track) which is fabricated on the disk and/or mask is obliterated and the tachometer can no longer perform its function.

SUMMARY OF THE INVENTION

The present invention overcomes the prior art problems by mechanically designing the electro-optical tachometer so that a positive mechanical spacer establishes the spacing between the mask and disk. Also, the disk/mask spacing is maintained constant by a resilient member which is connected to the mask assembly and floats (i.e., adjusts) said assembly relative to the disk.

Specifically, the electro-optical tachometer includes a self adjusting mask support plate. A mask having a specified pattern thereon is seated on the support plate. The support plate with the mask is fastened to the frame or housing of the device which is monitored.

The movable portion of the device is fitted with a hub and disk assembly. An optical pattern of light and dark lines are fabricated on the periphery of the disk. The space between the mask and disk is set by a spacer which includes a thrust bearing and a hardened washer combination. One of the hardened washers is tooled into the support plate and the other hardened washer is tooled into the disk assembly. The hardened washers are parallel to the mask and disk surfaces respectively.

A thrust bearing is positioned between the hardened washers. A spring assembly is positioned so as to load the support plate and mask against the hub disk assembly. An accurate spacing is set by using close tolerance tooling and close tolerance bearings, while a constant and accurate spacing is maintained by the spring exerting a biasing force against the support plate.

In one feature of the invention, plate guide pins are used to prevent rotational movement of the support plate. However, the support plate is allowed to move axially. Stated another way, the mask plate is allowed to float in a direction perpendicular to the rotating disk.

In still another feature of the invention mask guide pins are fabricated on the support plate and are used to set the initial relation or synchronization between the mask and rotating disk.

The foregoing and other features and advantages of the invention will be apparent from the following more particular description of preferred embodiments of the invention, as illustrated in the accompanying drawings.

BRIEF DESCRIPTION OF THE DRAWINGS

FIG. 4 is an exploded pictorial view of an alternate embodiment. This embodiment of the invention is best adapted for use in an electrophotographic copier environment.

DESCRIPTION OF THE PREFERRED EMBODIMENT

Although the present invention may be used in any environment where one member moves relative to a referenced or fixed point, the invention is best suited for use in an environment where one member rotates relative to a fixed reference. This being the case, the invention will be described in the environment of a rotary motor. The fact that the invention is described in this environment should not be construed as a limitation on the scope of the invention, since it is within the skill of the art to modify the teaching disclosed herein so that its applicability may be extended to other fields.

Figure 1:
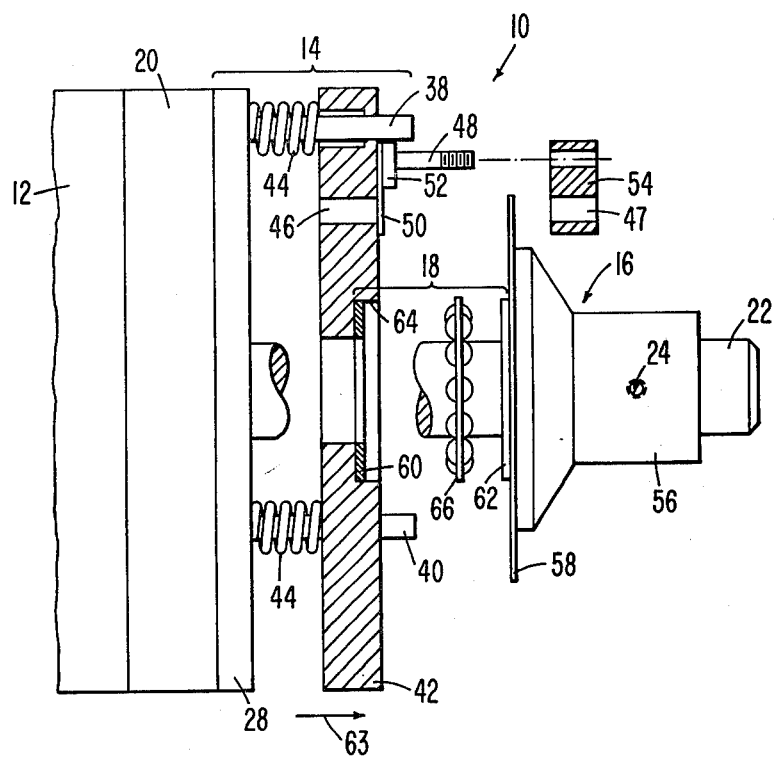
FIG. 1 is a side view of the electro-optical tachometer according to the invention.

Referring now to FIG. 1, a pictorial side view of electro-optical tachometer 10 is shown connected to motor 12. The electro-optical tachometer embodying the present invention includes fixed assembly 14, movable assembly 16 and spacer assembly 18. Fixed assembly 14 is connected to motor housing 20 and remains stationary. Likewise, movable assembly 16 is attached to motor shaft 22 by means of fastening screw 24. Of course, other fastening means may be used for attaching the movable assembly to motor shaft. For example, in FIG. 2 the movable assembly is attached to the rotating shaft by holding clip 26. As the motor shaft rotates, the movable assembly rotates relative to the fixed assembly. As is well known to those skilled in the art, as the movable assembly rotates relative to the fixed assembly, electrical signals are generated. The signals are used for controlling the motor. The spacer assembly is interposed between the fixed assembly and the movable assembly. The function of the spacer assembly is to set a gap or space between the movable assembly and the fixed assembly. In FIG. 1 the electro-optical tachometer is shown in a disassembled form. However, when the electro-optical tachometer is assembled, the spacing between the movable assembly and the fixed assembly is relatively narrow, for example, within the range of from 2 to 4 mils. With this narrow spacing, the spacer assembly cannot be viewed externally.

Still referring the FIG. 1, the fixed assembly includes mounting plate 28. The mounting plate is securely fastened to motor housing 20. In the preferred embodiment of this invention, a plurality of mounting screws 30, 32, 34 and 36 (see FIG. 3) are used for mounting the mounting plate to the motor housing. The mounting plate is positioned on the motor housing so that it is concentric with the motor shaft 22. To this end a hole is bored in the center of the mounting plate. The hole is such that the shaft can pass through without obstruction. In the preferred embodiment of this invention, the mounting plate has a substantially circular shape. However, any other type of shape could be used without departing from the scope of this invention. A plurality of plate guide pins, for example, 38 and 40 are rigidly mounted about the periphery of the mounting plate. The pins are so positioned that their length runs in a direction substantially parallel to the shaft of the motor. As will be explained subsequently, the plate guide pins serve a plurality of functions each of which is necessary for the satisfactory operation of the electro-optical tachometer. Without detailed discussion at this point, suffice it to say that the pins are used for positioning mask support plate 42 in the correct location so that it is in alignment with the movable assembly hereby referred to as a rotatable assembly and for supporting resilient backing means 44 (FIG. 1) which bias the mask support plate in a direction substantially parallel to the motor shaft and, as a result, maintain a constant spacing between the fixed assembly and the rotatable assembly.

Still referring to FIG. 1, mask support plate 42 is fitted to the guide pins through a plurality of holes two of which are shown in the drawings. The mask support plate is substantially circular in shape with a plurality of holes fabricated in its periphery and is so seated on the guide pins that one of its surfaces is in contact with the resilient means. The holes on the mask support plate are such that this plate can only move in the axial direction, that is, a direction parallel to the axis of the motor. With this restriction on the motion of the mask support plate, as the electro-optical tachometer tends to move axially (i.e., walk) on the shaft of the motor, the axial force which is exerted on the mask support plate by the resilient means tends to force the mask support plate and its attachment into the rotatable assembly and, thereby, maintain a constant gap or spacing. Opening 46 is fabricated in the mask support plate. As will be explained subsequently, this opening is necessary for attaching the light receiving assembly to the electro-optical tachometer. Adjustment means 48 is positioned on the surface of the mask support plate. The adjustment means is used for setting a zero or initial position between the fixed mask 50 and the rotating assembly and/or the rotating shaft.

Figure 3:
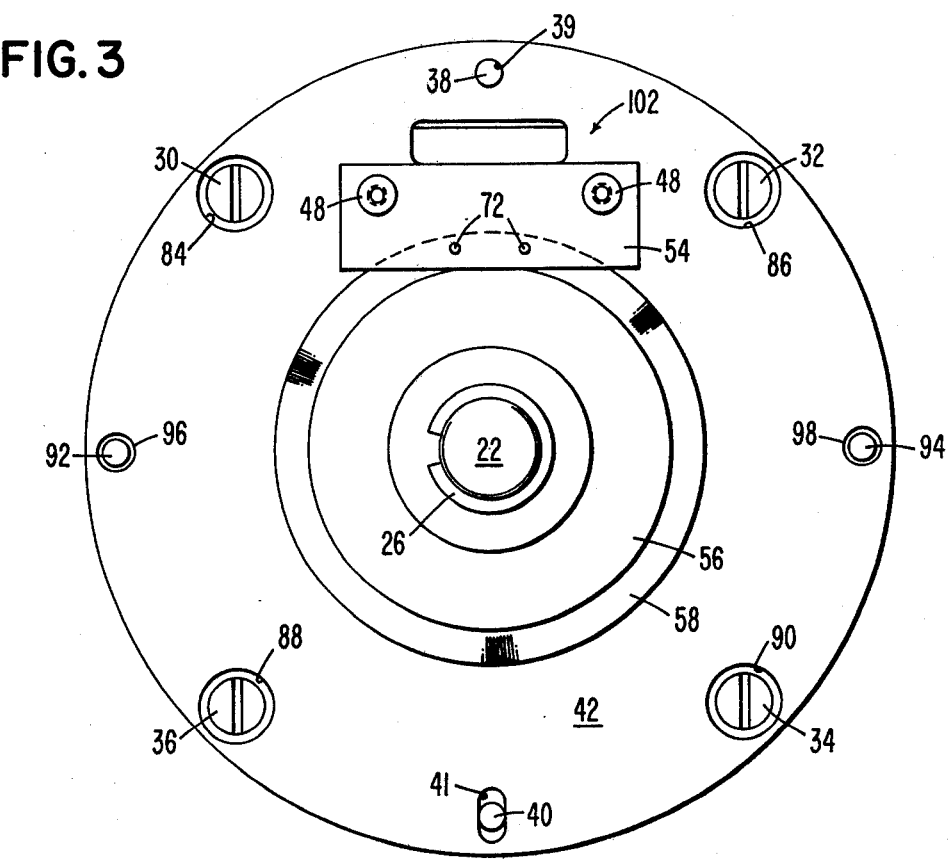
FIG. 3 is an end view of the electro-optical tachometer as it is seated on the shaft and housing of the motor of FIG. 2.

In this embodiment of the invention, the adjustment means comprises two pins, only one of which is shown in FIG. 1. The pins are positioned in a straight line on the surface of the mask support plate (FIG. 3). Each of the pins has a threaded portion at the top and a smooth portion at the bottom. The stationary mask 50 is then fitted over the screws so that it rests parallel to and on the mask support plate. A second spacer means 52 is then placed over the pin and in contact with the mask. The second spacer means separates the mask from plate 54 which carries the light emitting assembly. The light emitting assembly fits into opening 47. An elongated nut (not shown) is screwed onto pin 48 and maintains the mask spacer and support plate in a secured position.

Still referring to FIG. 1, rotatable assembly 16 is attached to the rotating motor shaft and rotates therewith. The movable assembly includes an integral truncated cone shaped hub portion 56. The hub portion is fabricated with a hole and fits over shaft 22. Transparent optical disk 58 is concentrically attached to hub 56. The disk has a centrally located hole which aligns with the hole in the hub and allows the assembly to be mounted onto the rotating shaft. The utilization of rotating optical disks is well known in the art and, therefore, its composition, fabrication, will not be discussed in detail. Suffice it to say that an optical pattern characterized by a plurality of light and dark lines are positioned about the periphery of the optical disk. As the optical disk rotates between the fixed mask and the light emitting/light receiving receptacles, an interference pattern is generated and an analog signal is outputted from the light receiving assembly. The signal is usually processed through a squaring circuit and a plurality of electrical pulses are generated.

The generation of electrical pulses from the interaction between a rotating disk and a stationary mask together with a light emitting/light receiving means, for example, light emitting diode hereinafter referred to as LED and light receiving transistors hereinafter referred to as LET are well known in the prior art. The broad concept does not form any part of the present invention and, therefore, will not be discussed in detail.

Still referring to FIG. 1, spacer assembly 18, sometimes called separator means 18 is interposed or positioned between the fixed assembly and the rotatable assembly. The function of the spacer assembly is to set the gap or spacing between the rotatable assembly and the fixed mask which is seated on the fixed assembly. The spacer assembly also functions in combination with resilient means 44 to maintain the spacing constant. The spacer assembly includes hardened wahsers 60 and 62 respectively. Hardened washer 60 is fabricated with a central hole so that it can slide over shaft 22 and is seated in groove or channel 64 which is fabricated in the mask support plate. The hardened washer is so fitted that it is concentric with the motor rotating shaft. Thrust bearing 66 is then positioned concentrically about the shaft and fits on hardened washer 60. The diameter of the balls in the thrust bearing are substantially equivalent to the gap spacing which is required between the rotating disk and the stationary mask. Generally, this gap setting is within the range of from 2–4 mils. As will be explained subsequently, hardened washer 60 is attached to support plate 42 by a potting compound. By using a potting compound, hardened washer 60 can be positioned in a direction parallel to the mask surface (that is the axial direction can be adjusted) and, therefore, a variable gap setting is attainable. Hardened washer 60, when positioned in its groove, is substantially parallel to the stationary mask on support plate 42. Hardened washer 62 having characteristics substantially equivalent to hardened washer 60 is attached to hub 56 and is parallel to the disk surface. The movable assembly is then slid against the thrust bearing with hardened washers 60 and 62 in contact with the surface of the thrust bearing. With the two washers arranged parallel to one another and the thrust bearing preventing them from moving closer than the initial setting, an accurate gap is set between the stationary mask and the rotating disk. Instead of using the thrust bearing other combination, for example, a low friction spacer that is fabricated from Teflon, a low energy material may be used to form the separator between the rotating assembly and the stationary assembly.

In order to maintain the spacing constant once the gap is set, the mask support plate with its attachment is biased in a direction parallel to arrow 63 by resilient means 44. Stated another way, the mask support plate with its attachment is biased toward the rotating assembly by resilient means 44. In the preferred embodiment of the present invention the resilient means is a spring. Three springs, two of which are shown in FIG. 1, are used. Each of the springs is positioned about a pin guide which supports the mask support plate. Of course, it is within the skill of the art to use a different type of spring, for example, wave type spring, without departing from the scope of the present invention. Also, the spring can be positioned about the rotating shaft fixed to the mounting plate without departng from the scope of the present invention. Also, the resilient backing means need not be a spring. It may be a resilient type of plastic or rubbery material. This rubbery material needs to have a force that would tend to load the fixed assembly against the rotary assembly as the rotary assembly moves along the rotating shaft in an axial direction. By attaching the resilient means to create a constant biasing force, the spacing between the rotating disk and stationary mask is maintained constant.

Figure 2:
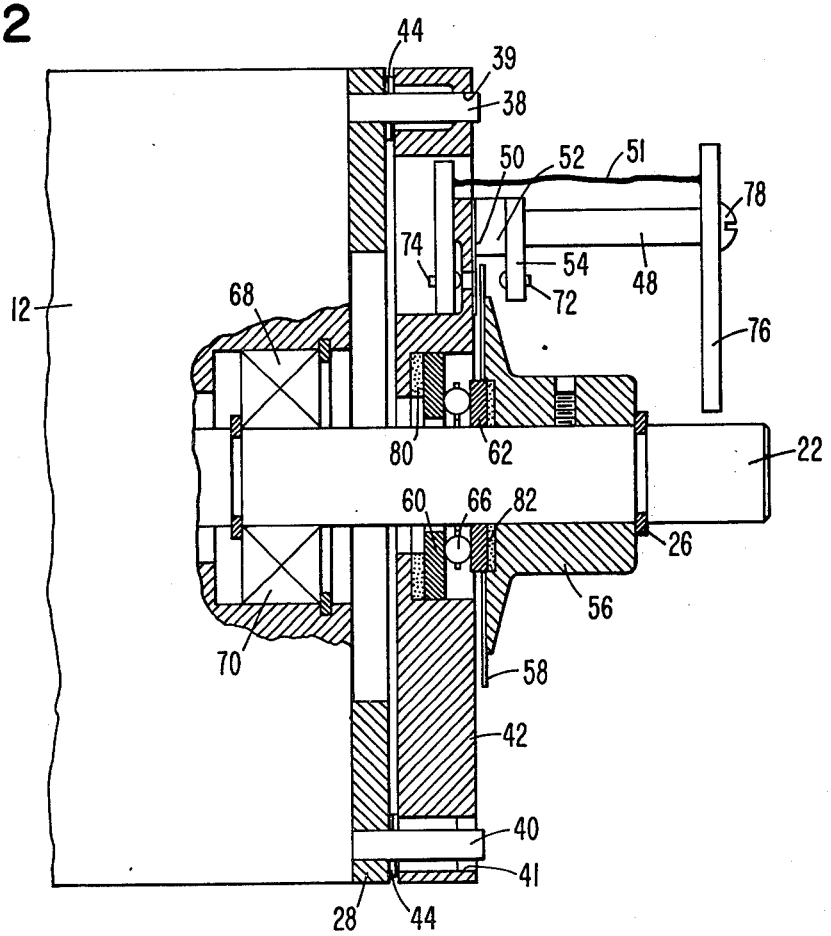
FIG. 2 is a cross section of the electro-optical tachometer as it is fitted to the rotating shaft and housing of a motor.

Referring now to FIG. 2, a cross section of the electro-optical disk, according to the teaching of the present invention, is shown. In an attempt to simplify the description, elements in this cross sectional view which are identical to elements previously discussed in FIG. 1 will be identified by the same numeral. Rotation of shaft 22 is effectuated by a plurality of bearings in the motor housing. Two of these bearings, 68 and 70, respectively, are shown in the figure. Mounting plate 28 with plate guide pins 38 and 40 thereon is shown connected to the motor housing. Positioned between the mounting plate and the support plate 42 is resilient backing means 44. This resilient backing means is a heavy washer spring. The function of the spring is to load the fixed assembly of the tachometer against the movable assembly. Guide pins 38 and 40 fit into receptacle holes 39 and 41 respectively. Attached to mask support plate 42 is stationary mask 50. Spacer 52 is then positioned on stationary mask and LED 72 is connected to plate 54 which is positioned against spacer 52. Optical disk 58 which is connected to hub 56 rotates in spaced alignment with the stationary mask. As the assembly rotates, the light and dark lines which are fabricated on the optical disk intercept the beam which is outputted from the LED. The light lines allow transmission of the beam which is picked up by phototransistor 74. The analog signal is outputted by means of electrical conductor 51, and is fed into electrical circuits, (not shown) which are positioned on circuit card 76. The circuit card is mounted via screw 78 onto the adjustment pins.

As was stated previously, the spacer assembly, which includes thrust bearing 66, hardened washer 60, and hardened washer 62 can be adjusted so as to change the setting between rotating disk 58 and mask 50. The effectuate adjustment, hardened washer 60 is seated in a groove fabricated in support plate 42. The hardened washer is attached to the groove by potting compound 80. By altering the thickness (that is the volume) of the amount of potting compound, hardened washer 60 and hence the ball bearing is moved in a direction parallel to axis 22 and, thereby, adjust the gap setting. Similarly, hardened washer 62 is attached to hub portion 56 by potting compound 82. By altering the thickness of the potting compound, the gap is adjusted in the manner similar to that previously described.

Referring now to FIG. 3, an end view of the electro-optical tachometer attached to a motor is shown. The mounting plate (not shown in this figure) is attached to the motor housing by screws 30, 32, 34 and 36 respectively. As is evident from FIGS. 1 and 2, mask support plate 42 is concentric with but spaced from mounting plate 28 (not shown in FIG. 3). In order to reach screws 30, 32, 34 and 36 which hold the mounting plate to the motor housing, access holes 84, 86, 88 and 90, are positioned about the periphery of mask support plate 42. The access holes are positioned so as to be aligned with the screws. The mask support plate is attached to the mounting plate by locating pins 38, 40, 92 and 94 respectively. The resilient means, for example springs, are positioned about the locating pins and float (that is bias) the mask support plate so as to maintain a constant space or gap between the rotating disk and the stationary mask.

As was stated previously, the attachment of the electro-optical tachometer to monitor the characteristics of a rotating shaft is such that the fixed assembly and the movable assembly have motion in one common direction, particularly along the shaft of the rotating device. However, for proper operation the fixed assembly and attachment must be restricted from circular and/or radial motion. As a result, means are provided which allow the fixed assembly to move in an axial direction but cannot move circularly and/or radially. The means include the characteristic and the inter-relationship between the plate guide pins and the holes which receive the plate guide pins. As is shown in FIG. 3, although exaggerated for explanation purposes, the receiving holes 96 and 98 are slightly larger than locating pins 92 and 94. As a result, the fit between the pins and associated holes is relatively low. Likewise, the fit between locating pins 38, 40 and access holes 39 and 41 is much closer. By fabricating the locating pins so as to retain the aforementioned recited relationship with the respective accessing hole, the mask support plate can move in and out of the page, that is along shaft 22. To prevent rotational movement, the access holes 39 and 41 are fabricated diagonally from one another. Also, at least one of the access holes, for example access hole 41, is designed with an elliptical shape wherein the major access of the ellipse coincides and runs in a direction parallel to the diagonal between the two holes. As is evident from the figure due to the elliptical shape of access hole 41, the mask support plate cannot rotate. As is evident from FIG. 3, the movable assembly including hub 56 and transparent disk 58 with light and dark lines 59, is seated on shaft 22 while the light emitting and light receiving assembly 102 is positioned via adjustment means 48 relative to the rotating disk. Access hole 101 allows electrical conductors to be connected between processing circuits on board 76 (FIG. 2) and the LED/PT assemblies.

Figure 5:
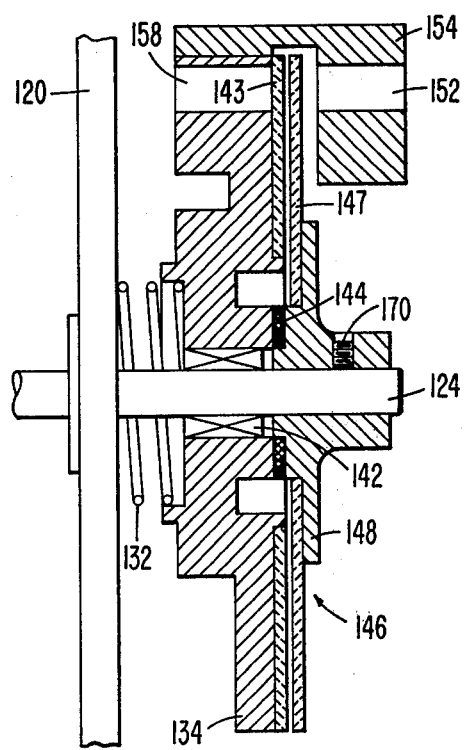
FIG. 5 is a cross sectional view of the embodiment shown in FIG. 4.

Referring now to FIGS. 4 and 5, an alternate embodiment of the present invention is shown. This embodiment of the invention is specifically suited for use in an electrophotographic environment. Before addressing the embodiments shown in FIGS. 4 and 5, it is worthwhile mentioning the basic characteristics of a conventional electrophotographic copying machine and the specific problems associated with said machine when an optical tachometer is used therein.

Conventional electrophotographic machines comprise a photoconductor material seated on a support substrate. The combined substrate and photoconductor is referred to as an electrophotographic plate. Conventional electrophotographic plates may be a drum with rotary motion. Positioned about the periphery of the rotating photogaphic plate is a plurality of processing stations. The processing stations, which include a charging station, an exposing station, a developing station, a transfer station and a cleaning station, are used to develop a latent image which is projected from an original document through a lens and lighting system to the photoconductor drum. Without describing the entire photographic process, which is well known in the art, suffice it to say that the electrophotographic drum, together with its processing station are seated in a frame and the combination is called an electrophotographic machine.

The conventional method of mounting an electro-optical tachometer in an electrophotographic machine is to attach the tachometer fixed assembly to the machine frame while the rotary assembly is attached to the rotating shaft of the electrophotographic drum. The recited method of mounting operates satisfactorily until a deflection in the machine frame occurs. Several every day occurrences contribute to the deflection in the machine frame, for example, rolling the machine across the floor, placing heavy books on top of the machine, etc. Also, in portable machines it is impractical to design a machine frame which is sufficiently rigid to prevent deflection. Usually the deflection is in the range of 0.002-0.004 inches. This deflection range is far greater than the spacing between the rotating disk and stationary mask of an optical tachometer.

Another problem, which aggrevates the effects suffered by conventional mounting techniques, is the movement of the drum shaft which affects the spacing between the fixed and movable assembly of the electro-optical tachometer. The net result is that any movement between the electrophotographic shaft and the frame results in disk mask damage, misalignment, etc. when the conventional method of mounting is used.

Referring now to FIG. 4, an exploded view of an alternative embodiment of the optical tachometer according to the present invention is shown, while a cross-section of the tachometer assembly is shown in FIG. 5. As with the previously described embodiment, the tachometer includes mounting surface 120. The mounting surface is fabricated with a centrally located hole 122. The hole function is to receive the rotating shaft, 124, of the electrophotographic plate (not shown). Mounting surface 120 is fabricated with a platform 126, upon which eccentric pin 128 is attached. As will be explained subsequently, eccentric pin 128 unites with slot 130 to align the mask and disk or shaft and mask with a zero position.

Still referring to FIGS. 4 and 5, the mounting surface is connected by means not shown to some reference position seated on the frame of the electrophotographic machine or the housing of the electrophotographic drum. Positioned about shaft 124 is loading spring 132. Any type of spring can be used for loading spring 132. However, in the preferred embodiment of this invention a coil spring is used. The relationship between shaft 124 and loading spring 132 is such that it fits snugly about shaft 124 and exerts force in a direction parallel to the shaft when compressed by the other components of the tachometer.

Positioned next, or in contact with loading spring 132, is free floating plate 134. The free floating plate has at least two holes, 156 and 158 respectively. The holes are used for positioning the phototransistor of the LED/phototransistor assembly. Positioned on the periphery of the floating plate is a rectangular support block 140 with slot 130 therein. In addition to its previously mentioned alignment function, block 140 prevents any rotational motion of the free floating plate. Positioned next to floating plate 134 is mask 143. Mask 143 may be circular as is shown in the figure or it may be a section of a circle. The important point is that there is a pattern generated on the mask which correlates with the pattern on the disk to generate output pulse as the disk rotates in the presence of an LED/phototransistor assembly. The free floating plate 134 is loaded through a low friction bearing 142 (FIG. 5) against drum shaft 124. As is evident, the free floating plate is restrained from rotating by eccentric pin 128 and hole 130 in block 140. Spacer means 144, which is fabricated from a low friction material, is used to set the gap between the mask 143 and rotating disk 147. Stated another way, the fixed portion of the tachometer is loaded by the spring through spacer 144 against the rotating portion. Positioned next to the spacer is the rotating assembly 146 of the tachometer. The rotating assembly includes hub 148 suitable for mounting on shaft 124 and disk 147 concentrically mounted about the hub. The hub disk assembly includes a plurality of light emitting and light blocking patterns (called light lines and dark lines) which are fabricated on the periphery of the disk. The disk is so positioned that it is in optical alignment with the stationary mask. Support block 154 is attached to floating plate 134. The support block is fabricated with groove 153 which fits around annular surface 151. The support block carries the light emitting diodes (LEDs) not shown, which generate light (i.e., illumination) for the phototransistor. The LEDs fit into holes 150 and 152 respectively. Positioned next to the spacer means is an electronic circuit support means (not shown). The electronic circuit support means carries the electronic circuit, for example, squaring circuits which operate on the pulse output from the phototransistors which are seated on floating plate 134. Referring to FIG. 5 for the moment, hole 136 which is located in the floating plate is used to attach the phototransistors (not shown), while hole 150 is used for receiving the LED (not shown).

In operation, the optical tachometer shown in FIG. 4, is assembled about shaft 124. The disk is bonded to the shaft by a screw, (not shown), through receiving holes 170. With this arrangement, spring 132 is in compression and exerts a force against the floating plate which, in turn, loads the mask through spacer 144 onto the rotating disk and thereby maintaining a constant spacing between the mask and disk.

The described invention lends itself to a packaging concept for an electro-optical tachometer which is easy to assemble and easily installed on a motor or other instrumentality or device, the movable portion of which is to be monitored. The aforementioned device provides velocity control, synchronization, and angular position signals for the operation and control of various devices. By adapting the teaching disclosed in the aforementioned device, the following benefits inure to the user.

The rotating disk surface, of the electro-optical tachometer, runs parallel to the mask surface with a predictable and controllable gap therebetween.

Increased ability to accurately adjust coded pattern of the disk to an angular position on the shaft.

The disk pattern runs concentric to the mask pattern.

Allows one to use optical and electronic circuits that are relatively independent of aging effects.

Finally, all of the above can be practiced at a reasonable cost.

While the invention has been particularly shown and described with reference to a preferred embodiment thereof, it will be understood by those skilled in the art that various changes in form and details may be made therein without departing from the spirit and scope of the invention.

What is claimed is:

1. An electro-optical tachometer comprising in combination:
a movable assembly adaptable for mounting on the movable portion of a device;
said movable assembly comprising a hub portion,
a fastening means for attaching the hub portion to the movable portion of the device;
a transparent disk concentrically mounted on the hub having a plurality of light and dark lines defining an optical pattern;
a first spacer means connected to said hub;
a fixed assembly adaptable for mounting to the fixed portion of the device and positioned in spaced alignment with the movable assembly;
said fixed assembly having;
a support plate means;
an optical mask having an optical pattern thereon, said optical pattern being substantially identical to the pattern on the disk, and positioned in spaced alignment to the transparent disk;
a second spacer means connected to said support plate and in spaced alignment with the first spacer means;
a separator means positioned between the first spacer means and second spacer means; said spacer means being operable for defining a gap between the movable and fixed assembly;
mounting means operable for mounting the support plate to the device; and
resilient means operable for loading the fixed assembly against the first spacer means and thereby maintaining the gap constant.

2. The device as claimed in claim 1 further including light emitting source and light receiving source positioned about the transparent disk and operable to output electrical signals.

3. The device as claimed in claim 2 further including alignment means for aligning the mask with an initial position on the movable portion of the device and/or the initial position on the transparent disk.

4. The device as claimed in claim 1 wherein the first and second spacers are hardened washers.

5. The device as claimed in claim 1 wherein the separator means is a thrust bearing.

6. The device as claimed in claim 1 wherein the resilient means is a spring.

7. An electro-optical tachometer for mounting on the rotating shaft of a motor comprising in combination:
- a hub means for mounting on the shaft;
- a disk concentrically mounted on the hub and having light and dark lines thereon;
- a stationary mask positioned relative and in spaced alignment to said disk;
- support means operable for supporting said stationary mask;
- spacer means interposed between the stationary mask and the disk; said spacer means being operable to define a gap between the disk and mask;
- resilient means operable connected for maintaining the gap constant; and
- adjustment means operable connected for setting the mask so that a reference point on said mask is aligned with a reference point on the rotating shaft and/or disk.

8. The device as claimed in claim 7 further including fastening means for connecting the disk support means to the stationary housing of the motor.

9. The device as claimed in claim 8 further including a light receiving/light emitting assembly, said assembly associated with the disk and the stationary mask and operable to output electrical signals.

10. In an electrical motor wherein the rotating shaft is monitored by a conventionally arranged electro-optical tachometer having the conventional rotating optical disk assembly with an optical pattern thereon, the conventional fixed and spaced mask assembly with an optical pattern thereon, light producing source and light receiving source for outputting electrical pulses the improvement comprising in combination:
- a spacer means positioned between the fixed mask assembly and the rotating optical disk assembly, said spacer means being operable for setting the space therebetween; and
- resilient means operable for floating the mask assembly so as to maintain the spacing constant.

11. An electro-optical tachometer for mounting on the rotating shaft and housing of a motor comprising:
- fixed mounting surface connected to the housing;
- alignment means connected to the mounting surface;
- a mask support plate associated with the alignment means;
- an optical mask assembly seated on said mask support plate;
- disk assembly seated on said rotating shaft and operable to rotate therewith;
- spacer assembly positioned between the disk assembly and the optical mask assembly;
- said spacer assembly being operable to set a disk/mask gap; and
- resilient means for floating the mask support plate so as to maintain the gap spacing constant.

12. Spacer for defining the gap between a stationary assembly and a rotary assembly of an electro-optical tachometer comprising in combination:
- a support plate having a central opening and adapted for mounting to a rotating shaft;
- an annular groove fabricated on the surface of the support plate;
- a first hardened washer fitted in said groove; said washer having a central opening for mounting on the shaft;
- a thrust bearing positioned in contact with the first hardened washer, said thrust bearing being symmetrical with the rotating shaft and operable for setting the gap;
- a hub member having an opening and adapted for mounting on the rotating shaft and in spaced alignment with the thrust bearing; and
- a second hardened washer positioned symmetrically with the rotating shaft and connected to the hub member whereby the second hardened washer rides on the surface of the thrust bearing.

13. Method for controlling a gap between the rotating assembly and the fixed assembly, including a support mask plate, of an electro-optical tachometer which is seated on a rotating shaft comprising the following steps:
 (a) machining a concentric annular groove on the surface of the support plate:
 (b) placing a first hardened washer in the groove;
 (c) positioning a second hardened washer in spaced alignment with the first washer;
 (d) attaching the second hardened washer to the rotating assembly; and
 positioning a thrust bearing intermediate and to be in contact with the surface of the first hardened and second hardened washers.

14. The method as claimed in claim 13 further including the steps of biasing the support plate relative to the rotating assembly and fastening the rotating assembly to the rotating shaft.

15. Apparatus for restraining the motion of a member in all but one direction relative to a reference member, said apparatus comprising in combination:
- a mounting plate;
- fastening means for connecting the mounting plate to the reference member;
- a first set of locating pins connected to said mounting plate;
- a second set of locating pins connected to said mounting plate;
- a first set of access holes fabricated on the member; said first set of access holes being operable to receive the first set of locating pins and having a larger diameter to allow a loose fit between the first set of pins and the first set of access holes;
- a second set of access holes fabricated on the member and operable to receive the second set of locating pins;
- said second set of access holes having at least two holes, positioned in spaced relationship on a common axis, with one of said holes being elliptically shaped with the major axis of the ellipse running in any selected direction excepting the one direction of motion, whereby the fit between the second set of pins and second set of holes are relatively tighter than the fit between the first set of pins and first set of holes.

* * * * *